US007991633B2

(12) United States Patent
Baker et al.

(10) Patent No.: US 7,991,633 B2
(45) Date of Patent: Aug. 2, 2011

(54) SYSTEM AND PROCESS FOR JOB SCHEDULING TO MINIMIZE CONSTRUCTION COSTS

(75) Inventors: Andrew B. Baker, Eugene, OR (US); Matthew L. Ginsberg, Eugene, OR (US); Tristan Smith, Eugene, OR (US); Daniel B. Keith, Eugene, OR (US); Andrew Parkes, Walsall (GB); Bryan Smith, Eugene, OR (US)

(73) Assignee: On Time Systems, Inc., Eugene, OR (US)

( * ) Notice: Subject to any disclaimer, the term of this patent is extended or adjusted under 35 U.S.C. 154(b) by 2081 days.

(21) Appl. No.: 10/014,919

(22) Filed: Dec. 11, 2001

(65) Prior Publication Data

US 2005/0065826 A1    Mar. 24, 2005

Related U.S. Application Data

(60) Provisional application No. 60/255,083, filed on Dec. 12, 2000.

(51) Int. Cl.
*G06Q 40/00* (2006.01)

(52) U.S. Cl. ................ 705/7.13; 705/7.12; 705/7.11

(58) Field of Classification Search ............. 705/35, 705/40, 7.13
See application file for complete search history.

(56) References Cited

U.S. PATENT DOCUMENTS

| 5,291,397 A | 3/1994 | Powell | |
| 5,524,077 A * | 6/1996 | Faaland et al. | 705/8 |
| 5,548,506 A | 8/1996 | Srinivasan | |
| 5,767,848 A | 6/1998 | Matsuzaki et al. | |
| 5,911,134 A * | 6/1999 | Castonguay et al. | 705/9 |
| 6,070,144 A | 5/2000 | Ginsberg et al. | |
| 6,415,259 B1 * | 7/2002 | Wolfinger et al. | 705/8 |
| 6,490,566 B1 | 12/2002 | Schmidt | |
| 6,578,005 B1 | 6/2003 | Lesaint et al. | |
| 6,678,698 B2 | 1/2004 | Fredell et al. | |
| 2001/0047274 A1 * | 11/2001 | Borton | 705/1 |
| 2002/0052770 A1 * | 5/2002 | Podrazhansky | 705/7 |
| 2002/0065702 A1 * | 5/2002 | Caulfield | 705/9 |

OTHER PUBLICATIONS (Smith) A. Cesta, A. Oddi, and Stephen Smith, "Iterative Flattening: A Scalable Method for Solving Multi-Capacity Scheduling Problems," Proceedings National Conference on Artificial Intelligence (AAAI-00), Jul. 2000.*

(Amico) Dell'Amico, M. and Trubian, M. 1993. Applying tabu search to the job-shop scheduling problem. Ann. Oper. Res. 41, 1-4 (May 1993), 231-252.*

(Continued)

*Primary Examiner* — James Kramer
*Assistant Examiner* — James Vezeris
(74) *Attorney, Agent, or Firm* — Fenwick & West LLP

(57) ABSTRACT

Increased efficiency and lower cost job scheduling is provided by a system and method that optimizes for cost instead of makespan, and minimizes fluctuations in resource utilization. A schedule is constructed using a workflow scheduling system that includes a load leveler, a cost minimizer, and a manpower planner. The load leveler minimizes makespan, subject to resource limits, and then lowers the resource limits, repeating the process in order to create a flatter schedule. The cost minimizer generates an initial solution, and then incrementally improves it, using the manpower planner to evaluate the different possible solutions. The manpower planner calculates, for a given schedule, the optimal hire/fire decisions to minimize total cost.

38 Claims, 8 Drawing Sheets

OTHER PUBLICATIONS (Stidsen) T. Stidsen, L. V. Kragelund, O. Mateescu, Jobshop Scheduling in a Shipyard, European Conference on Artificial Intelligence, Budapest, 1996.*

A Heuristic Model for Scheduling Large Projects with Limited Resources Author(s): Jerome D. Wiest Source: Management Science, vol. 13, No. 6, Series B, Managerial (Feb. 1967), pp. B359-B377.*

"A Heuristic Model for Scheduling Large Projects with Limited Resources" Jerome D Wiest Management Science, vol. 13, No. 6, Series B, Managerial (Feb. 1967).*

Smith et al., "Slack-Based Heuristics for Constraint Satisfaction Scheduling", *AAAI-93 Proceedings* (www.aaai.org), 139-144 (1993).

* cited by examiner

Task 300

Task ID

AMR001B

Time Units Required

302 — 896

304 — Resource Units Needed

| Resource ID | Amount |
|---|---|
| 1 | 0 |
| 2 | 0 |
| 3 | 21056 |
| 4 | 6423 |
| 5 | 0 |
| . | . |
| . | . |
| . | . |
| n | m |

*Fig. 3*

SYSTEM AND PROCESS FOR JOB SCHEDULING TO MINIMIZE CONSTRUCTION COSTS

CROSS-REFERENCE TO RELATED APPLICATIONS

This application claims the benefit of provisional application No. 60/255,083, filed Dec. 12, 2000 and incorporated by reference herein in its entirety.

BACKGROUND OF THE INVENTION

1. Field of Invention

The present invention relates generally to scheduling complex jobs, and particularly to a scheduling system and process that minimizes the cost of job completion.

2. Description of the Related Art

There is a wide variety of complex projects that take place throughout the modern global marketplace. Because of the sheer size of these projects, substantial planning and organization is required. For example, one does not just build a building. Rather, one starts with a design, drafts blueprints, and works in stages up to the finished project, overcoming hundreds of hurdles along the way. In terms of the actual construction itself, even this must be well planned ahead of time. For example, certain aspects of a construction project cannot be completed out of sequence. When constructing a ship, one cannot paint the ship until the hull is built. An elevator cannot be installed in a building until there is an elevator shaft. These are two simple examples, but it is easy to understand how there could be hundreds or thousands of constraints such as these in any large project involving construction. Furthermore, we can generalize this problem beyond the construction space. In fact, any large project, whether it be construction, manufacturing, or even the execution of a computer program, that has certain constraints on the utilization of resources, has a need for an efficient allocation of those resources according to some well planned schedule, in order to control the cost of the project.

A variety of automated scheduling techniques has been developed in recent years. These techniques often work by reducing scheduling problems to "Constraint-Satisfaction Problems" (CSPs) and then applying one of a variety of CSP techniques to solving them. See, for example, U.S. Pat. No. 6,070,144, "System and Process for Job Scheduling Using Limited Discrepancy Search," to Ginsberg et al., which is herein incorporated by reference in its entirety; and articles by Stephen Smith, Senior Research Scientist, ICL Laboratory, which may be found at http://www.ri.cmu.edu/people/smith_stephen.html. Virtually all of these techniques have been designed to minimize the "makespan" of the schedule in question, i.e., the time taken to complete the job in its entirety. In some cases, an attempt is made to level the resources utilized while the job is in process, for instance as is done by the "Resource Leveling" tool in Microsoft's Project software, but typically the "load leveling" technology is just a misnomer for a search algorithm that minimizes makespan. For example, the load leveling option in Artemis, a commercial scheduler by Artemis Management Systems of Boulder, Colo., requires that the user specify predetermined resource limits. If no schedule can be found that honors these user-specified limits, the deadline of the schedule is slipped as necessary.

In practice, minimizing schedule makespan is often a stand-in for the true optimization goal of minimizing the total cost of resources used during construction. Consider, for example, the cost of labor. This cost is a function of the actual labor cost of the tasks in the schedule itself, which can be represented as $L_a$, together with the costs involved in having workers sit idle while waiting for something to do, or hiring and/or firing workers who are no longer needed to complete a project, which can be symbolized as $L_i$. The overall cost of project completion, L, is typically a combination of the actual working costs and the "indirect" costs associated with hiring and layoffs, idle workers and overtime, i.e. $L=L_a+L_i$.

It has generally been felt that since shorter schedules involve fewer gaps where workers are idle, i.e. lower values of $L_i$, makespan minimization leads to the least expensive schedules. However, even with makespan minimization, there can still be a large amount of inefficiency in the resulting schedules, leading to waste and unnecessary cost. For example, an overly short schedule might incur extra costs to hire the workers needed to complete the task in such a short time, or more generally, it might cause (or fail to prevent) unnecessary variation in the work effort. Even lowering the maximum resource usage does not necessarily minimize the costs associated with the variation in resource usage. For example, suppose the maximum resource usage for a particular resource were lowered to 20 people. The schedule might have 20 people on one day, and two people on the next day, thus incurring substantial inefficiency.

Even small inefficiencies can mean substantially higher costs. A one percent cost increase in the building of a $500 million nuclear submarine is $5 million—hardly negligible.

Therefore, what is needed is a system and method for producing a workflow schedule that results in increased efficiency—and thus financial savings—compared to present systems, including those using simple makespan minimization schedules.

BRIEF SUMMARY OF THE INVENTION

In accordance with the present invention, there is provided a system and method for job scheduling providing increased efficiency and lower cost compared to present systems.

In practice, costs can be reduced substantially if the primary optimization criterion is changed from the length of the schedule to the cost of completing the job. However, optimizing for cost involves two separate challenges, neither of which has been heretofore addressed.

First, processes are needed that, instead of only minimizing makespan, also minimize fluctuations in resource utilization. These processes can either exploit the effectiveness of existing makespan minimizers, or use new processes with this optimization goal in mind. The present invention does both of these.

Second, the schedules produced by the above processes need to be evaluated to determine their total cost. This requires the development of an effective tool that can take a schedule and determine optimal resource usage decisions associated with it, identifying optimal resource availability that will minimize the excess cost of hiring/firing, idle and overtime. While "resources" is used generally in this description to refer to physical labor, i.e. people, any resource having an associated cost of acquisition, use, and/or release, is appropriate for consideration. Similarly, although "cost" is frequently measured in monetary terms, it should be understood that any quantifiable cost, whether monetary or non-monetary, can be optimized as described herein.

In accordance with an embodiment of the present invention, a schedule is constructed using a workflow scheduling system that includes a load leveler, a cost minimizer, and a manpower planner. The load leveler minimizes makespan, subject to resource limits. These limits are lowered, and the process is repeated. The result is a "flatter" schedule, i.e., a schedule with fewer extremes of resource usage. The cost minimizer generates an initial solution, and then incrementally improves it, using the manpower planner to evaluate the different possible solutions, thus guiding the search. The manpower planner determines, for a given schedule, the optimal hire/fire decisions to minimize total cost, including base cost, hiring cost, firing cost, overtime, and undertime. In one embodiment, the manpower planner is implemented using dynamic programming. In an alternative embodiment, it is implemented using linear programming. The manpower planner is used as part of the cost minimizer, and can also be used to analyze and evaluate the final result of the load leveler.

An overall schedule is developed by the load leveler in one embodiment as follows: an initial set of resource limitations is passed to the load leveler, which then attempts to produce a schedule conforming to those limitations. If such a schedule is produced, the resource limitations are reduced and the load leveler is reinvoked. This process repeats until the load leveler fails to find a valid schedule, because the resource limits are too low for the task to be completed in the allowed time, at which point the previous valid schedule is used as the initial schedule.

Alternatively, a seed generation procedure of the cost minimizer can be invoked directly. This proceeds by identifying an admissible window for each task in the schedule with the property that all tasks must demonstrably be executed inside the corresponding window. If the task is executed earlier than its associated window, then it can be shown that there is insufficient time to complete all of the predecessors of the given task; if it is executed later than the associated window, there will be insufficient time to complete the following tasks before the schedule deadline.

The tasks are then selected in priority order, with each task being scheduled within the associated window in a way that minimizes the total cost of the partial schedule (using the manpower planner described below). These remaining windows are contracted and the process repeats until all tasks have been scheduled.

After the initial schedule is constructed, it is evaluated one or more times by the cost minimizer's incremental improvement procedure. This component functions by examining each task in conjunction with the manpower planner to see to what extent overall costs would be reduced if the task were moved elsewhere in its allowable window. The task is then relocated as appropriate to achieve the best resulting schedule. After the task is relocated, the windows for the other tasks are then adjusted based on the task's new position (depending on the task's new position, the other windows may end up being contracted, expanded, or both). The process terminates with a final schedule, according to a predetermined set of rules, such as after a fixed number of iterations or when no further improvement is possible.

In one embodiment, the manpower planner is used by the load leveler to produce an optimization problem using the final schedule. This problem includes information regarding the availability of required resources as a function of time, and the cost of any particular resource profile. This cost is obtained by adding the amount of time each resource is used effectively, sits idle, works overtime, is initially employed, or is no longer needed by the schedule. In other embodiments, additional constraints are employed that specify other operating conditions, e.g., where worker overtime is limited to 50%, or workers can only be hired or fired on Fridays.

The manpower planner then computes an optimal plan for the use of resources, e.g., a profile of how many workers should be employed on each day of the schedule. The manpower planner computes the cost of the schedule using this optimal worker profile, and the result is presented as the candidate least-cost solution to the original scheduling problem. More generally, when the resources are something other than workers, the planner computes the optimal profile for acquiring and releasing that resource.

In a preferred embodiment, the manpower planner is used by the cost minimizer to direct the placement of each task during the initial seed generation procedure. It is then called at every step of the incremental improvement procedure, as described below with reference to FIGS. 4 and 5.

In such a manner, the present invention produces a schedule having optimal overall allocation of resources for the project in question.

The features and advantages described in this summary and the following detailed description are not all-inclusive, and particularly, many additional features and advantages will be apparent to one of ordinary skill in the art. Moreover, it should be noted that the language used in this disclosure has been principally selected for readability and instructional purposes, and may not have been selected to delineate or circumscribe the inventive subject matter, resort to the claims being necessary to determine such inventive subject matter.

BRIEF DESCRIPTION OF THE SEVERAL VIEWS OF THE DRAWINGS

FIG. 3 illustrates a diagram of a task in accordance with an embodiment of the present invention.

DETAILED DESCRIPTION OF THE PREFERRED EMBODIMENTS

In the discussion set forth below, for purposes of explanation, specific details are set forth in order to provide a thorough understanding of the invention. It will be appreciated by those skilled in the art that the present invention may be practiced without these specific details. In particular, those skilled in the art will appreciate that the methods described herein can be implemented in devices, systems and software other than the examples set forth. In other instances, conventional or otherwise well-known structures, devices, methods and techniques are referred to schematically or shown in block diagram form in order to facilitate description of the present invention.

The present invention includes steps that may be embodied in machine-executable software instructions, and includes method steps that are implemented as a result of one or more processors executing such instructions. In other embodiments, hardware elements may be employed in place of, or in combination with, software instructions to implement the present invention. The software instructions may be stored in RAM or ROM, or on other media including removable media.

Figure 1:
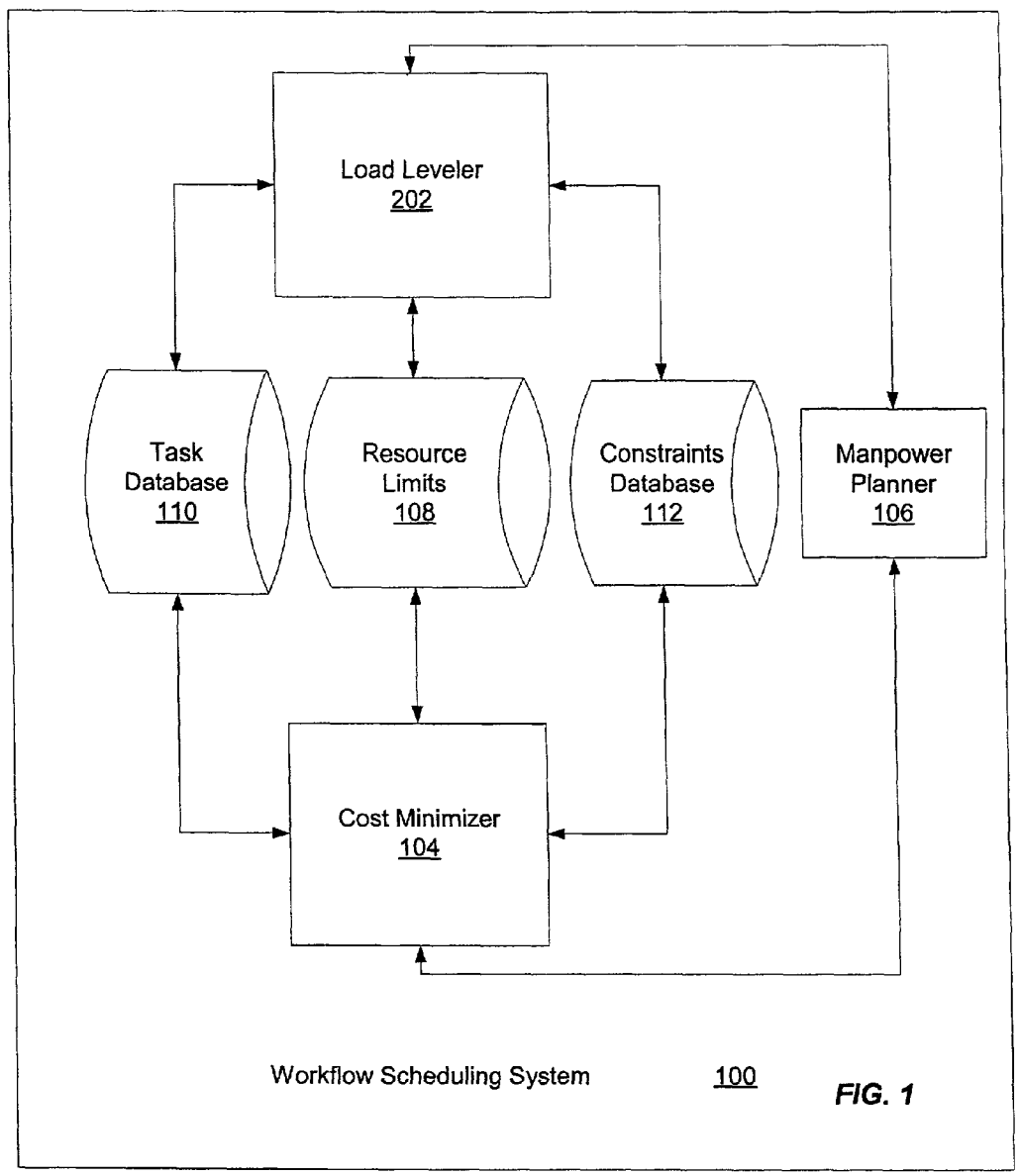
FIG. 1 is a block diagram of a system in accordance with an embodiment of the present invention.

Referring now to FIG. 1, there is shown a block diagram of a system in accordance with an embodiment of the present invention. System 100 includes a load leveler 202, a cost minimizer 104, a manpower planner 106, resource limits database 108, task database 110, and constraints database 112. In one embodiment, each of these components resides on a single computer system. In alternative embodiments, different components of system 100 may reside on multiple computer systems, and communicate, e.g., over a network.

Load leveler 202 includes logic to minimize the makespan of a given schedule, subject to resource limits and task constraints. The operation of load leveler 202 is described further below, with respect to FIG. 2. Cost minimizer 104 generates an initial solution, and then incrementally improves it using manpower planner 106 to evaluate different possible solutions, thus guiding the search. Manpower planner 106 calculates, for a given schedule, the optimal hire/fire decisions to minimize total cost including base cost, hiring cost, firing cost, overtime, and undertime. Manpower planner 106 is implemented in two alternative ways—using dynamic programming and using linear programming. Manpower planner 106 is used as part of cost minimizer 104, and also to analyze and evaluate the final result of load leveler 202.

Figure 2:
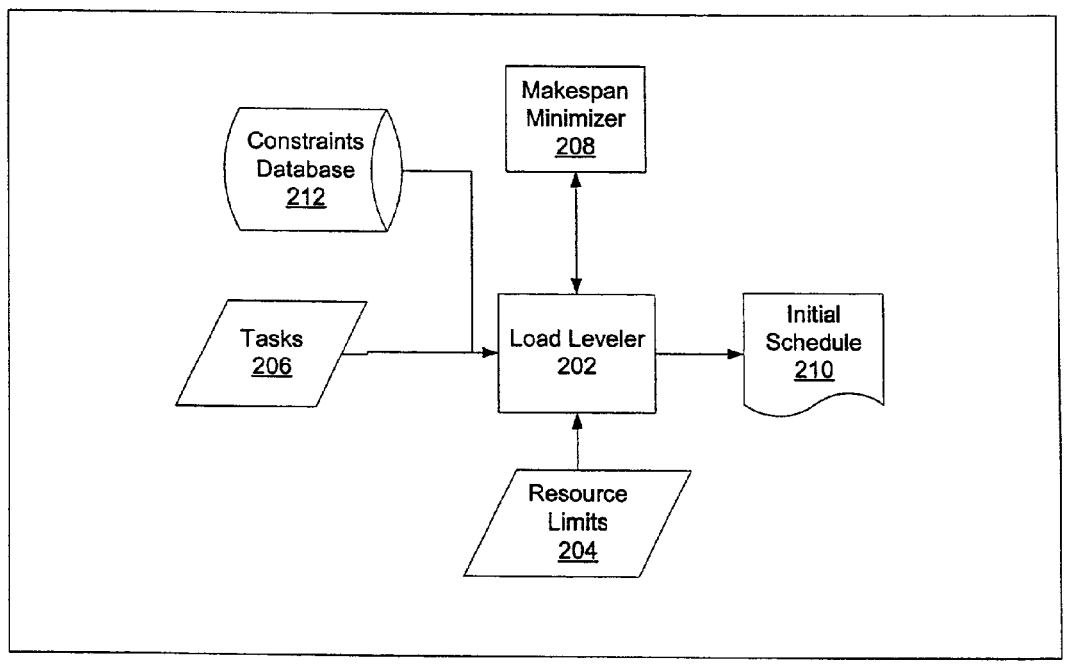
FIG. 2 illustrates the formation of an initial schedule using a load leveler in accordance with an embodiment of the present invention.

Referring now to FIG. 2, there is shown load leveler 202, which creates an initial schedule 210 by multiple calls to a makespan minimizer 208. Inputs passed to the makespan minimizer by the load leveler include a set of tasks 206, resource limits 204, and a set of constraints 212. Tasks and constraints are described further below.

Referring now to FIG. 3, there is shown a diagram of a task 300. Tasks 300 are steps in the workflow process that must be completed in order for the process to successfully conclude. For example, if the schedule being created is for the construction of a ship, some of the tasks might include welding, painting, completing electrical work, etc. In a preferred embodiment, each task has an associated duration 302, and a resources requirement 304. Tasks may be subject to certain constraints, as described further below. The duration 302 of a task is how long the task will take to complete, expressed, for example, in hours. In other embodiments, duration is measured in days, weeks, or other units. Resource requirements 304 represent the number of laborers (or other resource units) required to perform the task.

In one preferred embodiment, a task is set out according to the following layout:
AMR001B,896,0,0,0,0,0,0,0,0,0,0,0,0,0,0,0,0,0,0,0,0,0,0, 0,0,0,0,0,0,
0,0,0,0,0,0,0,0,0,0,0,0,0,0,0,0,0,0,0,0,0,0,0,0,0,0,0,0, 0,0,0,
0,0,0,0,0,0,0,0,0,0,0,0,0,0,0,0,0,0,0,0,0,0,0,0,0,0,0,0, 1396,0,
0,0,0,0,0,0,0,0,14956,13806,0,0,0,0,0,0,0,0,0,0,0,21083, 6708,0

In the above example, the task format is: task ID, total hours required to complete the task, required amount of resource 1, required amount of resource 2, . . . , required amount of resource n, where n is the total number of resource groups available. Thus, in this example, task AMR001B requires 896 hours to complete, and requires resources corresponding to the groups identified with non-zero entries in the comma-delimited fields.

Tasks are stored in task database 110. In a preferred embodiment, constraints database 112 stores data that indicates which tasks are subject to constraints. In one embodiment, constraints are of the following form:

constrained task ID, constraining task ID, constraint type, constraint value

In one embodiment, possible constraint types are start-start constraints, start-finish constraints, finish-start constraints, and finish-finish constraints. A start-start constraint, symbolized in one embodiment by the value "SS", means that the constrained task cannot start until some amount of time after the constraining task has started. The amount of time is specified by the constraint value. A start-finish constraint (symbolized by "SF") means that the constrained task cannot finish until some time after the constraining task has started—again, the required delay is indicated by the constraint value. Similarly, "FS" represents a finish-start constraint, in which the constrained task must start some time after the constraining task finishes, and "FF" indicates that the constrained task must finish some time after the constraining task finishes. The constraint value once again indicates the appropriate time required for these two constraint types. In a preferred embodiment, the constraint value is expressed in hours. In other embodiments, the constraint value is expressed in other units. For example, "AMR001B, AMS020A, SS, 360" is a valid constraint in a preferred embodiment, and indicates that the task having ID AMR001B is constrained by task AMS020A, in that task AMR001B cannot start until 360 hours after the start of task AMS020A.

In addition to the set of tasks, the load leveler 202 takes as input, either from a user or from a file containing a preliminary schedule, a set of resource limits 204. The resource limits specify the maximum available number of resources in each resource group. Resource groups identify different types of resources, e.g., welders, painters, etc.

Figure 6:
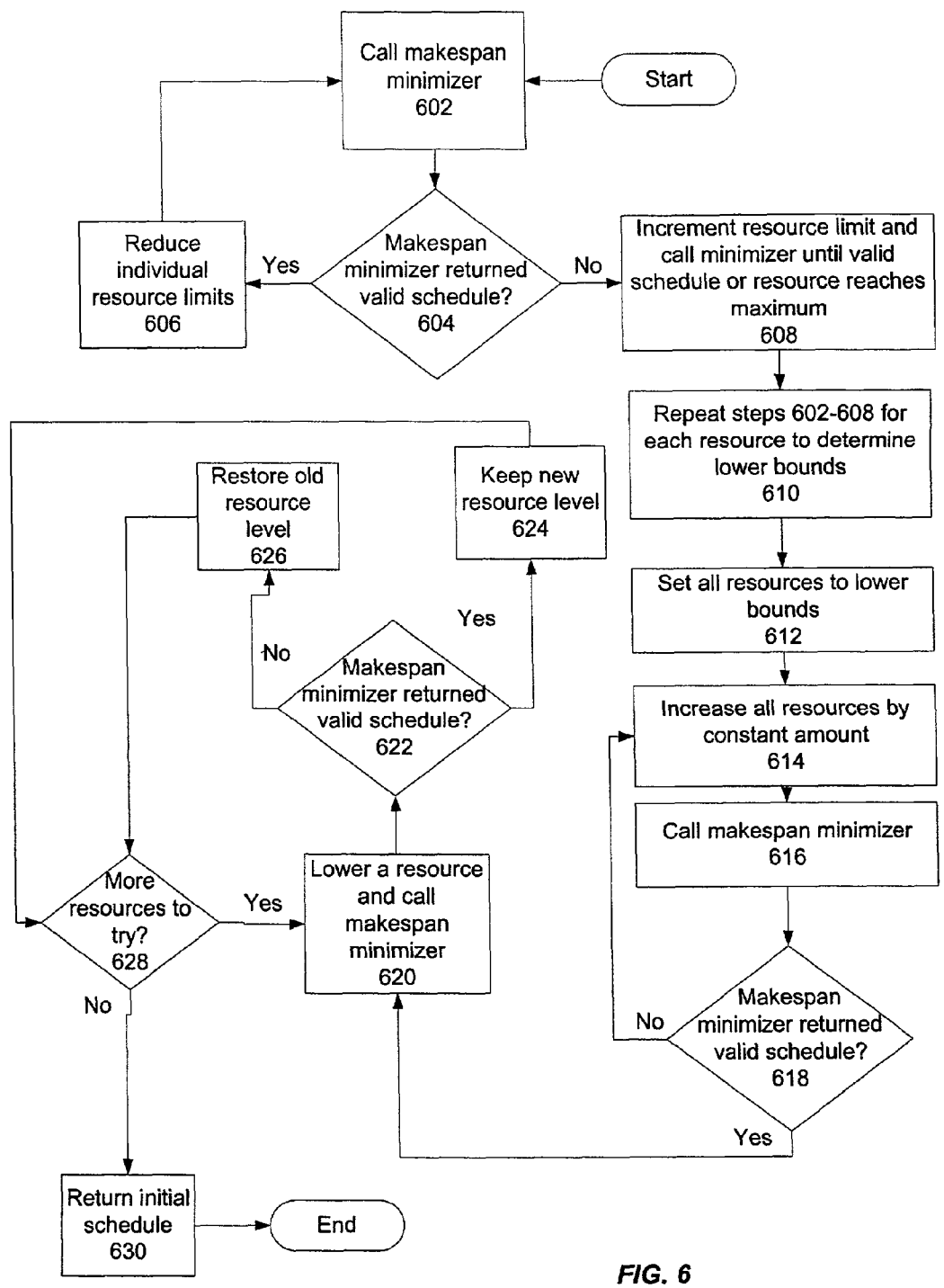
FIG. 6 is a flowchart illustrating the operation of the load leveler in accordance with an embodiment of the present invention.

Referring now to FIG. 6, using the set of tasks 206, resource limits 204, and constraints 212, the load leveler 202 calls 602 the makespan minimizer 208 to create an initial work flow schedule 210 that completes each of the required tasks, satisfies each of the constraints associated with the tasks, and uses no more resources than are provided for by the resource limits. In one embodiment, the makespan minimization is done using a schedule packing algorithm, which is conventionally known. If the makespan minimizer 208 completes 604 this initial schedule 210, the load leveler lowers 606 the resource limits 204 as described below, and re-invokes 602 the makespan minimizer to create a new schedule.

The load leveler 202 gets initial resource levels from either the absolute resource constraints, or from a preliminary schedule. These initial resource levels function as upper bounds for resource usage. The load leveler 202 then searches for lower bounds by lowering 606 each resource individually, leaving the other resources at their upper bounds. In one embodiment, such as that illustrated in FIG. 6, this search is done using a binary search. Once the individual resource has been reduced 606 to the point where the makespan minimizer is not able to return 604 a valid schedule, the resource limit is incremented 608 until either a valid schedule is created, or the resource reaches its upper bound. For example, using a binary search algorithm, if the initial level of some resource is 16, load leveler 202 first tries to reduce the level to 8. If the makespan minimizer 208 is able to find a solution at 8, load leveler 202 will then try 4. If it is unable to find a solution at 8, it will then try 12, etc. In other embodiments, other search algorithms may be used, e.g., incremental modification. These steps are repeated 610 for each resource to determine all lower bounds.

Next, load leveler 202 sets 612 all resources to their lower bounds, and then increases 614 all the resources by a constant amount (except that no resource is increased above its upper bound) and calls 616 the makespan minimizer to look for a valid schedule. It repeats this until 618 it finds a level where the makespan minimizer 208 can find a solution.

Finally, load leveler 202 picks some resource, and tries to lower it 620 by a constant amount to see whether there still is a solution at the new level 622. If there is such a solution, then the resource is left at this lower level 624, and if there is not, then the resource is set back 626 to its old level. The process is repeated with different resources until 628 no improvement is possible, and the initial schedule is returned 630. Preference is given for resources whose current levels are farthest from the lower bounds determined using the binary search.

Cost Minimizer

Figure 4:
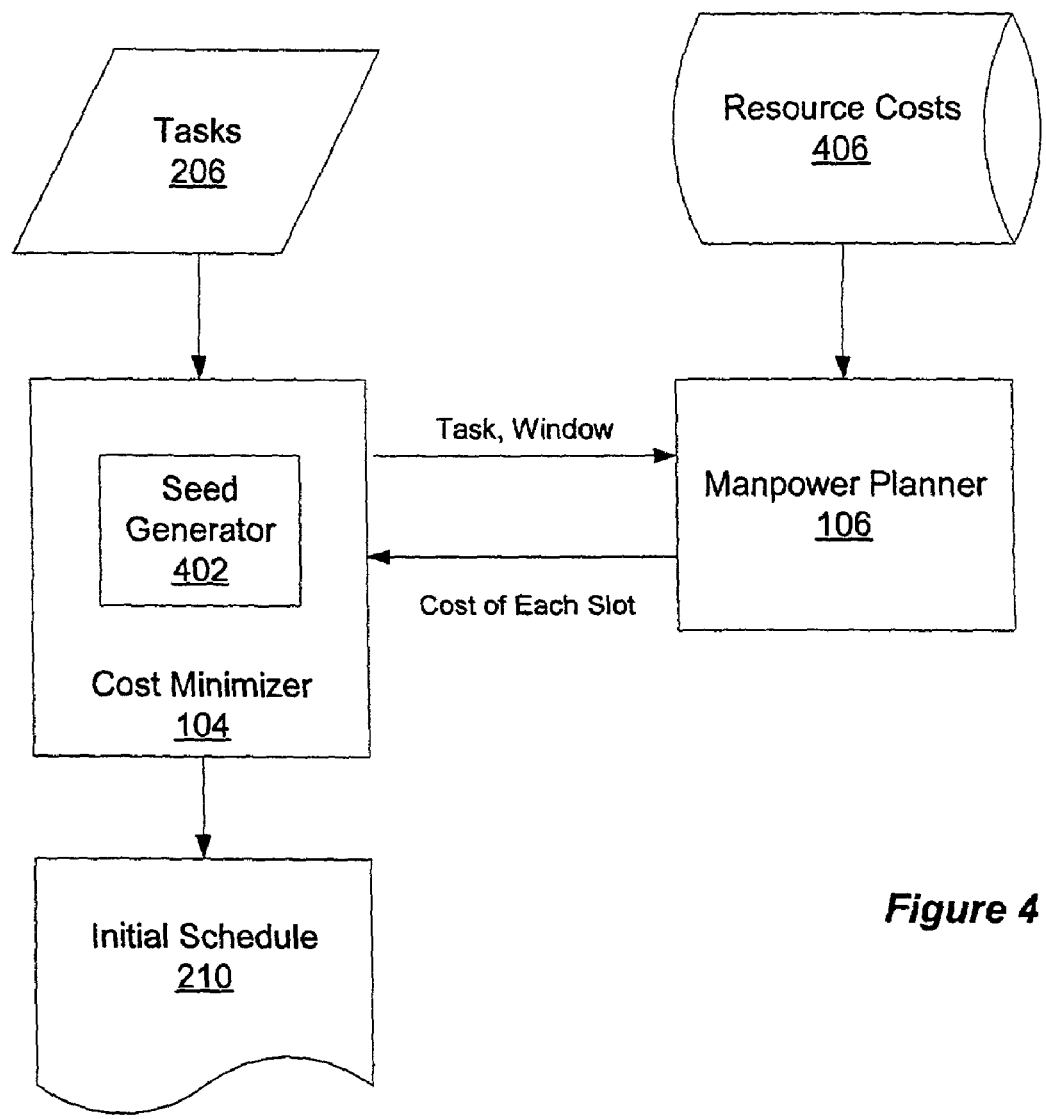
FIG. 4 illustrates the formation of an initial schedule using a seed generator and a manpower planner in accordance with an embodiment of the present invention.
Figure 7:
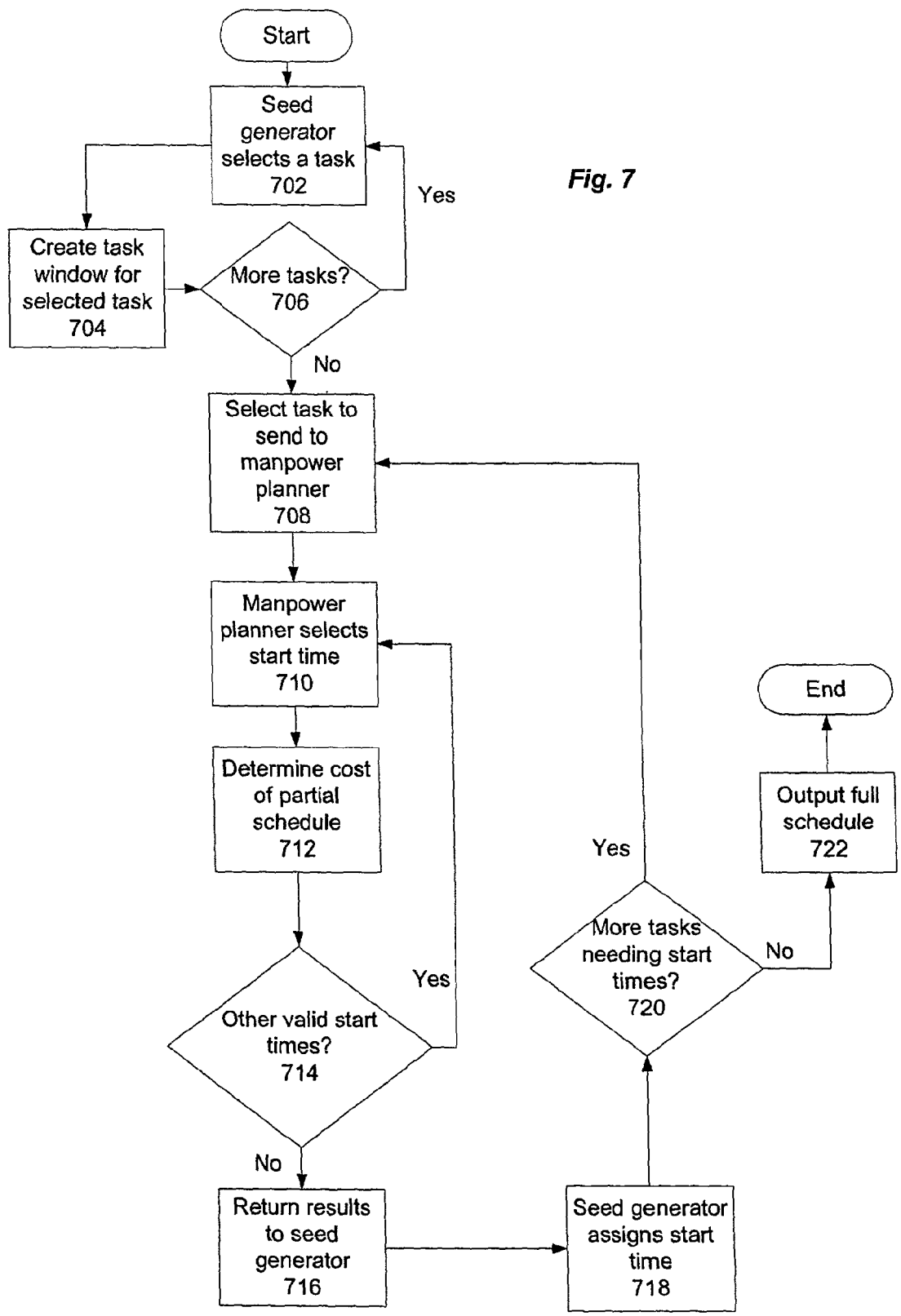
FIG. 7 is a flowchart illustrating the operation of a seed generation procedure of a cost minimizer in accordance with an embodiment of the present invention.

As an alternative to using load leveler 202, and referring now to FIGS. 4 and 7, an initial schedule can also be created using the cost minimizer's seed generation procedure 402.

The cost minimizer 104 includes a seed generator 402, which creates an initial schedule that is subsequently improved. The cost minimizer 104 takes as its input the set of tasks 206, as described above with reference to the load leveler 202. The seed generator 402 selects 702 a task 300 from the task set 206, and creates 704 a task window for each 706 selected task. The task window specifies valid start times for the task, and is the largest window consistent with certain conditions. In a preferred embodiment, these conditions are stored in the task database 110, and include the release time (the earliest valid starting time for the task), the task deadline (the latest valid ending time for the task), and the precedence of each task. Next, the seed generator 402 selects 708 a task to send to manpower planner 106. In a preferred embodiment, tasks are sent to the manpower planner 106 in increasing order of window size. In other embodiments, the order in which tasks are sent to the manpower planner 106 may be according to other criteria, including task length, number of successors (i.e., tasks constrained to start or finish after the given task), resource usage (quantity or number of resources), a value assigned from a previous schedule, or randomly. The manpower planner additionally is provided with a set of resource costs 406, i.e. the cost of each resource in each resource group. The costs are input by the user in one embodiment, and come from a file in another. They represent the actual costs of paying the different types of workers, hiring, overtime, etc. The manpower planner selects 710 a start time for the task in question, such that the task is started and completed within its allowed window. The cost of the partial schedule is then determined 712 based on the chosen start time of the task (ignoring the cost of tasks that remain to be scheduled). The task is then moved to a new start time within its window, and the cost recomputed. In a preferred embodiment, this process is repeated 714 for each valid start time in the task's window. The cost of the complete schedule and the associated start times are then returned 716 to the seed generator 402. The seed generator 402 then assigns 718 a start time to the task. In a preferred embodiment, this start time is the start time that minimizes the total cost of the workflow schedule, as reported by the manpower planner 106. In the case of a tie, a random choice is made as to which of the tying start times is assigned to the task. In other embodiments, a tie is broken in some other way, e.g., first in time, last in time, etc. Also, in still other embodiments, multiple schedules are generated. Since the cost minimizer's seed generation procedure makes some of the initial assignments randomly, generating multiple schedules may result in schedules having varying degrees of cost, allowing the cheapest one to be chosen.

This process continues for each task in the task set, until 720 each task has been assigned a valid start time. At this point, a full initial schedule 210 has been generated, and it is passed 722 to the incremental improvement engine.

Figure 5:
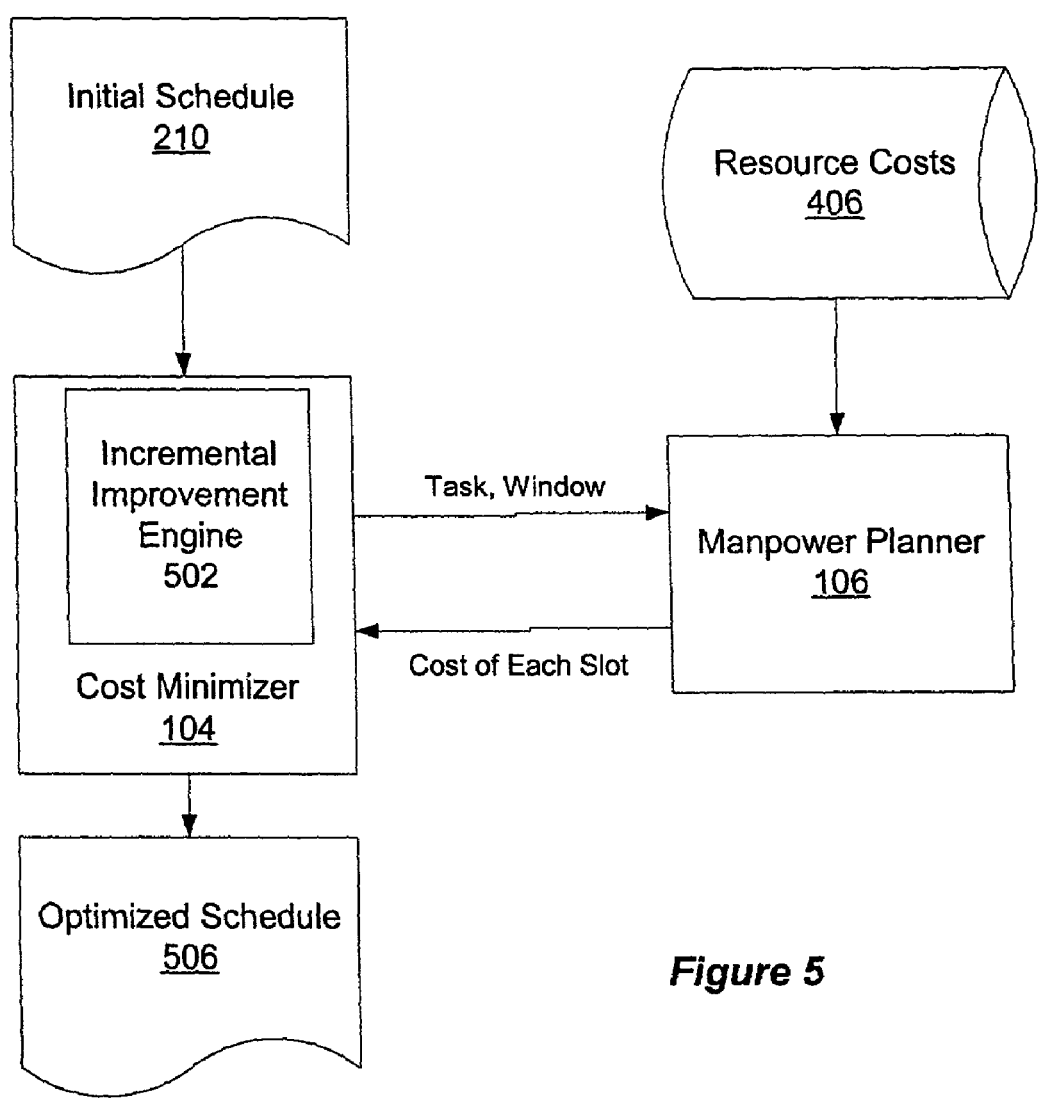
FIG. 5 illustrates the formation of an optimized schedule using an incremental improvement engine and a manpower planner in accordance with an embodiment of the present invention.
Figure 8:
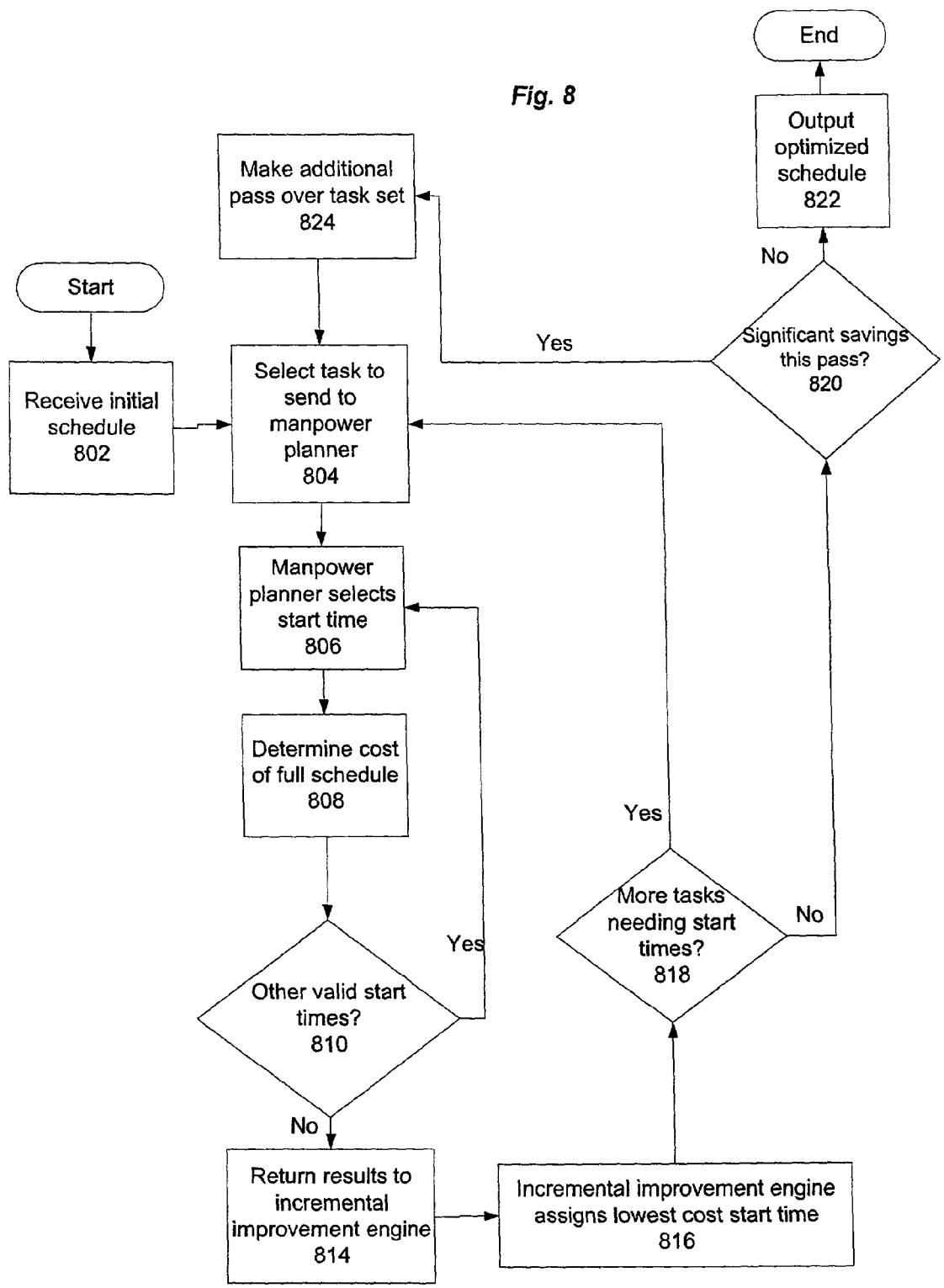
FIG. 8 is a flowchart illustrating the operation of an incremental improvement engine of a cost minimizer in accordance with an embodiment of the present invention.

Referring now to FIGS. 5 and 8, there is shown a block diagram of the operation of the cost minimizer's incremental improvement engine 502. The incremental improvement engine 502 of cost minimizer 104 receives 802 an initial schedule 210, created in one preferred embodiment by the seed generator 402, or in an alternative embodiment, by the load leveler 202. In other embodiments, the schedule may be created by other methods, or may even have been supplied externally. The incremental improvement engine 502 selects 804 a task from the initial schedule 210 and supplies the task to the manpower planner 106. The task may be selected randomly, or in any arbitrary order, since each full pass through the procedure will process every task. The manpower planner 106 selects 806 a start time for the task, and determines 808 the cost of the schedule at that start time, and at each other 810 valid start time, in a fashion like that described above with reference to the seed generator 402. However, since the manpower planner 106 now has access to a full schedule (the initial schedule) instead of just a partial schedule (as was the case when the initial schedule was being formed), the manpower planner makes better determinations about which start times minimize the overall cost of the schedule.

The manpower planner 106 returns 814 the task to the incremental improvement engine 502 along with a list of valid start times and total workflow schedule cost associated with starting the task at each of the valid start times. In one embodiment, each possible start time is evaluated for total cost by the manpower planner 106. In other embodiments, the manpower planner only evaluates valid start times occurring within a certain time frame, e.g. 4 days, of the original start time passed by the incremental improvement engine 502, plus a random sampling of some portion, e.g., 10%, of the remaining valid start times. In still other embodiments, different samples are evaluated for overall cost of the workflow schedule.

Once the incremental improvement engine 502 receives the cost of the different valid start times for a task, in a preferred embodiment it assigns 816 the start time associated with the lowest overall cost to that task, and then repeats the process for each task in the schedule. In another embodiment, the incremental improvement engine exhibits a degree of preference for start times that are farther away from the current start time. To do this, the incremental improvement engine 502 computes an adjusted cost by taking the actual cost, and then subtracting a constant multiplied by the absolute value of the change in the task's start time. The task is then rescheduled to the time that minimizes this adjusted cost. This preference is reduced over time in a simulated annealing type process. This preference for remote start times is alternated in some embodiments with one or more passes of the purely greedy optimization process described above, which looks for the lowest-cost solution in every case. An advantage of this selection method is that it avoids assignment of start times that result in local minimums (in terms of overall schedule cost), but not global minimums.

Once a starting time has been assigned to each 818 task 300, and if significant savings 820 have been accomplished, the incremental improvement engine 502 processes 824 the tasks again to further improve the schedule, i.e. each task is then sent to the manpower planner 106 to determine the lowest cost associated with all valid starting times for that task. Repeating the incremental improvement process takes advantage of the fact that the assignment of start times to tasks that are evaluated later in sequence by the incremental improvement engine 502 may make it possible to reoptimize tasks evaluated earlier, resulting in additional savings. Thus, the incremental improvement engine actually makes several passes over the set of tasks in a preferred embodiment. The incremental improvement engine continues to evaluate the set of tasks until no additional significant cost savings can be found 820. In a preferred embodiment, savings are deemed insignificant when the percentage (or absolute) improvement in cost after an entire pass through the tasks is less than some user-specified threshold. In other embodiments, the incremental improvement engine continues to optimize for a predetermined amount of time, and then outputs the best schedule found by the end of the time period.

Once the incremental improvement engine 502 has completed its optimization, it outputs 822 an optimized workflow schedule 506. In a preferred embodiment, a workflow schedule 506 lists each task 300 along with a start time and end time. The start time is, in a preferred embodiment, reported in hours after the beginning of the project start time. A sample schedule 506 may appear as follows:

| TaskCode | StartTime | EndTime |
|---|---|---|
| AMR001B | 19440 | 20336 |
| AMR001T | 15824 | 18048 |
| AMR002T | 19600 | 19760 |
| AMR003B | 16704 | 16944 |
| AMR003T | 20688 | 20848 |
| AMR004B | 14496 | 15456 |
| AMR004T | 15456 | 16256 |
| AMR006T | 16416 | 16576 |
| AMR007B | 11552 | 12016 |
| AMR007T | 15536 | 16096 |
| AMR008B | 12112 | 12432 |
| AMR008T | 15472 | 16096 |
| AMR009T | 14768 | 14816 |
| AMR010T | 16336 | 16416 |
| AMR012T | 16816 | 17056 |
| ... | ... | ... |
| WPN286T | 20016 | 21344 |
| WPN300T | 11152 | 12592 |
| WPN301B | 11552 | 12192 |
| WPN301T | 16656 | 16976 |
| WPN302T | 14352 | 14512 |
| WPN303T | 21904 | 21920 |
| WPN304F | 12064 | 12224 |

In the above example, each task is represented by a "TaskCode", and start and stop times are listed as "StartTime" and "EndTime," respectively. So, for example, the task having TaskCode WPN286T is scheduled to start at hour 20016 and end at hour 21344.

In determining the overall cost of the workflow schedule, the manpower planner 106 often repeats many of the same calculations. In one embodiment, the manpower planner can further improve its operational efficiency by determining intermediate results of the following form: (1) the optimal total cost from the beginning of the schedule up to some time point, assuming a given resource level at this time point; (2) the optimal total cost from some time point to the end of the schedule, assuming a given resource level at this time point. These calculations are efficient because the results for one time point make use of the results for the previous time point (in case 1) or the results for the subsequent time point (in case 2).

In a preferred embodiment, and for a moving task, the calculation of the optimal costs described in the preceding paragraph makes the above determinations for all relevant time points, omitting the resources for the task in question. That is, the cost (without the task) is computed from the beginning of the schedule up to the latest time that the task might start. The cost is also computed from the end of the schedule to the earliest time that the task might end. Then, for any particular placement of this task, the optimizer already has a full analysis of what happens before and after this task. So for any particular task placement, the manpower planner 106 only has to re-analyze the events during the task itself.

In one embodiment, the manpower planner 106 has another optimization. The dynamic programming algorithm described above computes an optimal cost from the beginning of the schedule to a given time point (or similarly, from the given point to the end of the schedule) as a function of the resource level at this time point. Since this calculation is typically done for each possible manpower level, the amount of computation per time point is proportional to the number of possible manpower levels. In practice, this function of the manpower level is a piecewise linear function, and not an arbitrary function. Therefore, one embodiment uses a specialized representation to model this function. It represents the function's value at each inflection point, and the slope between the inflection points, greatly reducing the necessary calculations.

The process of generating a seed schedule and then incrementally improving this schedule can be repeated multiple times. In one embodiment, on the first pass of the seed generation procedure (as described above), the tasks are processed in order, and each task is placed at that point in its window that minimizes the total cost of the partial schedule (based on the resources used by the current and previously assigned tasks, but ignoring the tasks yet to be placed). The incremental improvement engine 502 then improves this schedule. In one embodiment, the resulting schedule is then used by the next call to the seed generator 402 as follows. When a task is being placed by a subsequent call to the seed generator 402, system 100 takes into account the resources not just of the current and previously placed tasks, but also of tasks that are yet to be placed. For the tasks that are yet to be placed, system 100 assumes (as an approximation) that they will be placed in their position from the final schedule of the incremental improvement engine 502. One advantage of this process is that it provides a "look ahead," allowing the seed generator to optimize task placement based on the likely positions of future tasks.

The present invention also makes use of another optimization technique, as disclosed in U.S. Pat. No. 6,272,483, entitled "Cost-Optimizing Allocation System And Method," which is incorporated herein by reference, to further improve the schedule. As discussed above, the seed generator 402 first creates an initial schedule 210 by processing the tasks in order of increasing window size, and the incremental improvement engine 502 then incrementally improves this schedule. This entire process can be repeated multiple times, but the order in which the seed generator 402 processes the tasks is modified each time based on the empirical importance of the task. In a preferred embodiment, the importance of a task is the difference in schedule cost with and without the task. Tasks that are more important are increased in priority over those with lower priority. This enables the seed generator 402 to do a better job of scheduling the more important tasks. In an alternative embodiment, the difference between this cost difference and the task's theoretical cost (based on the amount of resource use required) is examined; this provides a measure of the disruption or synergy resulting from the current placement of the task. Theoretical cost is time multiplied by cost/unit time, e.g., if a task requires 100 manhours, and the cost is $30/hour, the theoretical cost is $3000.

As will be understood by those familiar with the art, the invention may be embodied in other specific forms without departing from the spirit or essential characteristics thereof, and the mechanisms that implement the invention or its features may have different names or formats. Accordingly, the disclosure of the present invention is intended to be illustrative, but not limiting, of the scope of the invention.

We claim:

1. A scheduling system for generating a schedule of start times for a plurality of tasks for a project, at least one task of the plurality of tasks having associated resources utilized to perform the task, the system comprising:
   at least one processor;
   a load leveler subsystem, executed by at least one of the processors, configured to receive data representative of the plurality of tasks for the project, and to generate a proposed schedule of start times for the plurality of tasks responsive to at least one scheduling constraint between at least two of the plurality of tasks and fluctuations of resources utilized to perform the plurality of tasks, wherein the plurality of tasks are steps in a workflow to complete the project, and wherein the at least one scheduling constraint requires a first task to be a predecessor to a second task within the workflow;
   a cost estimator subsystem, executed by at least one of the processors, communicatively coupled to the load leveler subsystem to evaluate the proposed schedule of start times for the plurality of tasks to compute optimal or nearly optimal resource availability levels, and from those resource availability levels estimate a cost associated with the proposed schedule of start times; and
   a cost minimizer, executed by at least one of the processors, communicatively coupled to the cost estimator for modifying the proposed schedule of start times for the plurality of tasks responsive to the resource fluctuations and its associated cost; wherein the load leveler subsystem is further configured to output data representative of the modified proposed schedule of start times for the plurality of tasks for the project.

2. The system of claim 1, wherein the cost estimator is implemented using dynamic programming.

3. The system of claim 1, wherein the cost estimator is implemented using linear programming.

4. The system of claim 1 wherein the load leveler further comprises a makespan minimizer configured to determine a minimum length schedule of tasks that uses at most a maximum number of resources to complete the plurality of tasks, at least one of the tasks of the plurality of tasks subject to at least one constraint on the location of the task in the schedule of start times for the plurality of tasks.

5. The system of claim 4 wherein the makespan minimizer uses a schedule packing algorithm.

6. The system of claim 1, wherein the cost minimizer subsystem comprises an incremental improvement engine configured to determine for each of a plurality of tasks, each task having a plurality of possible start times, a start time for the task that results in a lowest estimated cost for the proposed schedule of start times for the plurality of tasks.

7. A computer-implemented method for generating a schedule of start times for a plurality of tasks for a project, each task of the plurality of tasks having zero or more associated resources, the method comprising:
   receiving, by a specifically programmed computer system, data representative of the plurality of tasks and resources for a project, wherein the plurality of tasks are steps in a workflow to complete the project and there is at least one scheduling constraint between at least two of the plurality of tasks, and wherein the at least one scheduling constraint requires a first task to be a predecessor to a second task within the workflow;
   generating, by the computer system, a proposed schedule of start times for the plurality of tasks for the project responsive to the at least one scheduling constraint and fluctuations of resources utilized to perform the plurality of tasks;
   evaluating, by the computer system, the proposed schedule of start times for the plurality of tasks to compute optimal or nearly optimal resource availability levels, and from those resource availability levels estimate a cost associated with the proposed schedule of start times;
   modifying, by the computer system, the proposed schedule of start times for the plurality of tasks responsive to the resource fluctuations and the cost; and
   outputting, from the computer system, the modified proposed schedule of start times for the plurality of tasks for the project.

8. The computer-implemented method of claim 7, wherein evaluating the proposed schedule of start times for the plurality of tasks to estimate the associated cost further comprises using a dynamic programming model.

9. The computer-implemented method of claim 7, wherein evaluating the proposed schedule of start times for the plurality of tasks to estimate the associated cost further comprises using a linear programming model.

10. The computer-implemented method of claim 7, wherein generating the proposed schedule of start times for the plurality of tasks includes associating a limitation with each of the resources and producing the proposed schedule of start times for the plurality of tasks responsive to each limitation.

11. The computer-implemented method of claim 10, wherein generating the proposed schedule of start times for the plurality of tasks includes iteratively reducing the limitation for one of the resources and load-leveling the resources.

12. The computer-implemented method of claim 7, wherein evaluating the proposed schedule of start times for the plurality of tasks includes determining costs associated with the resource fluctuations.

13. The computer-implemented method of claim 12, wherein the costs associated with the resource fluctuations include at least one of the group of resource acquisitions costs, resource disposition costs, incremental costs for resource over-utilization, and incremental costs for resource under-utilization.

14. The computer-implemented method of claim 13, wherein resource acquisition costs include a hiring cost.

15. The computer-implemented method of claim 13, wherein resource disposition costs include a firing cost.

16. The computer-implemented method of claim 13, wherein incremental costs for resource over-utilization include an overtime cost.

17. The computer-implemented method of claim 13, wherein incremental costs for resource under-utilization include an idle resource cost.

18. The computer-implemented method of claim 7, wherein generating the proposed schedule of start times for the plurality of tasks comprises identifying an admissible window in the proposed schedule of start times for the plurality of tasks for each task of the plurality of tasks and iteratively placing each task of the plurality of tasks within the proposed schedule of start times for the plurality of tasks responsive to the admissible window, a priority of the task, and a cost of at least part of the proposed schedule of start times for the plurality of tasks having the task placed therein.

19. The computer-implemented method of claim 7, wherein evaluating the proposed schedule of start times for the plurality of tasks comprises examining one of the plurality of tasks to estimate the cost associated with the proposed schedule of start times for the plurality of tasks responsive to moving the task within a window describing allowable locations of the task in the schedule of start times for the plurality of tasks.

20. The computer-implemented method of claim 7, wherein the resource fluctuations are determined by using a profile for each of the resources.

21. A scheduling system for generating a schedule of start times for a plurality of tasks for a project, at least one task of the plurality of tasks having associated resources utilized to perform the task, the system comprising:
    at least one processor;
    a cost estimator subsystem, executed by at least one of the processors, configured to receive data representative of a proposed schedule of start times for the plurality of tasks for the project, to evaluate the proposed schedule of start times for the plurality of tasks to compute optimal or nearly optimal resource availability levels, and from those resource availability levels estimate a cost of the project associated with the proposed schedule of start times for the plurality of tasks, wherein the plurality of tasks are steps in a workflow to complete the project, wherein at least one scheduling constraint exists between at least two of the plurality of tasks, and wherein the at least one scheduling constraint requires a first task to be a predecessor to a second task within the workflow; and
    a cost minimizer, executed by at least one of the processors, communicatively coupled to the cost estimator and configured to modify the proposed schedule of start times for the plurality of tasks responsive to the resources utilized to perform the plurality of tasks and the estimated cost of the project and to output data representative of the proposed schedule of start times for the plurality of tasks.

22. The scheduling system of claim 21, wherein the cost estimator is implemented using dynamic programming.

23. The scheduling system of claim 21, wherein the cost estimator is implemented using linear programming.

24. A method for generating a schedule of start times for a plurality of tasks for constructing a ship, at least one task of the plurality of tasks having associated resources utilized to perform the task, the method comprising:
    receiving, by a specifically programmed computer system, data representative of the plurality of tasks for constructing the ship, wherein the plurality of tasks are steps in a workflow to construct the ship and there is at least one scheduling constraint between at least two of the plurality of tasks, and wherein the at least one scheduling constraint requires a first task to be a predecessor to a second task within the workflow;
    generating, by the computer system, a proposed schedule of start times for the plurality of the tasks responsive to the at least one scheduling constraint and fluctuations of resources utilized to perform the plurality of tasks;
    evaluating, by the computer system, the proposed schedule of start times for the plurality of tasks to compute optimal or nearly optimal resource availability levels, and from those resource availability levels estimate a cost associated with the proposed schedule of start times;
    modifying, by the computer system, the proposed schedule of start times for the plurality of tasks responsive to the resource fluctuations and a cost associated therewith; and
    outputting, from the computer system, data representative of a modified
    proposed schedule of start times for the plurality of tasks for constructing the ship.

25. The method of claim 24, wherein the plurality of tasks for constructing the ship comprise welding, painting, electrical work, or any combination thereof.

26. The method of claim 24, further comprising determining a minimum length schedule of tasks that uses at most a maximum number of resources to complete the plurality of tasks.

27. The method of claim 26, wherein at least one of the plurality of tasks is subject to at least one constraint on the location of the task in the schedule of start times for the plurality of tasks.

28. The method of claim 26, further comprising using a schedule packing algorithm.

29. The method of claim 24, further comprising determining for each of a plurality of tasks, each task having a plurality of possible start times, a start time for the task that results in a lowest estimated cost for the proposed schedule of start times for the plurality of tasks.

30. A computer-implemented method for generating a schedule of start times for a plurality of tasks for constructing a ship, each task of the plurality of tasks having zero or more associated resources, the method comprising:
    receiving, by a specifically programmed computer system, data representative of the plurality of tasks and resources for constructing the ship, wherein the plurality of tasks are steps in a workflow to construct the ship and there is at least one scheduling constraint between at least two of the plurality of tasks, and wherein the at least one scheduling constraint requires a first task to be a predecessor to a second task within the workflow;
    generating, by the computer system, a proposed schedule of start times for the plurality of tasks for constructing the ship responsive to the at least one scheduling constraint and fluctuations of resources utilized to perform the plurality of tasks;
    evaluating, by the computer system, the proposed schedule of start times for the plurality of tasks to compute optimal or nearly optimal resource availability levels, and from those resource availability levels estimate a cost associated with the proposed schedule of start times;
    modifying, by the computer system, the proposed schedule of start times for the plurality of tasks responsive to the resource fluctuations and the associated cost; and
    outputting, from the computer system, the modified proposed schedule of start times for the plurality of tasks for constructing a ship.

31. The method of claim 30, wherein the plurality of tasks for constructing the ship comprise welding, painting, electrical work, or any combination thereof.

32. The method of claim 30, wherein generating the proposed schedule of start times for the plurality of tasks includes associating a limitation with each of the resources and producing the proposed schedule of start times for the plurality of tasks responsive to each limitation.

33. The method of claim 32, wherein generating the proposed schedule of start times for the plurality of tasks includes iteratively reducing the limitation for one of the resources and load-leveling resources.

34. The method of claim 30, wherein evaluating the proposed schedule of start times for the plurality of tasks includes determining costs associated with the resource fluctuations.

35. The method of claim 34, wherein the costs associated with the resource fluctuations include at least one of the group of resource acquisitions costs, resource dispositions costs, incremental costs for resource over-utilization, and incremental costs for resource under-utilization.

36. The method of claim 30, wherein generating the proposed schedule of start times for the plurality of tasks comprises identifying an admissible window in the proposed schedule of start times for each task of the plurality of tasks and iteratively placing each task within the proposed schedule of start times for the plurality of tasks responsive to the admissible window, a priority of the task, and a cost of at least part of the proposed schedule of start times for the plurality of tasks having the task placed therein.

37. A method for generating a schedule of start times for a plurality of tasks for constructing a ship, at least one task of the plurality of tasks having associated resources utilized to perform the task, the method comprising:

receiving, by a specifically programmed computer system, data representative of a proposed schedule of start times for the plurality of tasks for constructing the ship, wherein the plurality of tasks are steps in a workflow to construct the ship and there is at least one scheduling constraint between at least two of the plurality of tasks, and wherein the at least one scheduling constraint requires a first task to be a predecessor to a second task within the workflow;

evaluating, by the computer system, the proposed schedule of start times of the plurality of tasks to compute optimal or nearly optimal resource availability levels, and from those resource availability levels estimate a cost of constructing the ship associated with the proposed schedule of start times for the plurality of tasks;

modifying, by the computer system, the proposed schedule of start times for the plurality of tasks responsive to the at least one scheduling constraint and the resources utilized to perform the plurality of tasks and the estimated cost of constructing the ship; and outputting, from the computer system, data representative of the proposed schedule of start times for the plurality of tasks.

38. The method of claim 37, wherein the plurality of tasks for constructing the ship comprise welding, painting, electrical work, or any combination thereof.

* * * * *